FIG_1

FIG_6

FIG_7

United States Patent Office 3,003,685
Patented Oct. 10, 1961

3,003,685
ESCAPEMENT CONTROL MECHANISM FOR TEN-KEY CALCULATING MACHINE
Harold J. Chall, Castro Valley, and Charles S. Balaz, Hayward, Calif., assignors to Friden, Inc., a corporation of California
Filed Aug. 15, 1955, Ser. No. 528,154
7 Claims. (Cl. 235—60)

This invention relates to calculating machines, such as the adding machine shown in the copending application S.N. 407,016 of Harold J. Chall, filed January 29, 1954, now Patent No. 2,832,530, issued April 29, 1958, and more particularly to such a machine having a repeat subtraction key as well as a repeat addition key, and an optional pin carriage escape mechanism or multiply arm operated by the repeat addition and the repeat subtraction keys of the machine.

It is among the objects of the present invention to provide in a calculating machine of the character indicated, a repeat subtraction key, as well as a repeat addition key, which repeat subtraction key, when held depressed, will cause the machine to subtract the same value during each cycle of the machine for as many cycles as the key is held depressed; to provide mechanism for escaping the pin carriage of a ten-key calculating machine, one step to the left each time the repeat addition key or the repeat subtraction key is consecutively released and depressed to thereby facilitate positive or negative multiplication by the calculating machine; and to utilize for the repeat subtract and multiplying operation, machine parts which are already provided in the machine for other purposes.

Other objects and advantages will become apparent from a consideration of the following description and the appended claims in conjunction with the accompanying drawings wherein:

The calculating machine fragmentarily shown in the accompanying drawings may be substantially the same as the machine disclosed in the patent of Harold J. Chall No. 2,832,530, issued April 29, 1958 for "Listing Adding Machine Mechanism" and Patent No. 2,832,534 of Harold J. Chall et al., issued April 29, 1958, for "Control Means for Listing Adding Machine," and only those portions of the entire machine cooperating with the repeat subtraction key and the optionally useable multiplier arm have been shown in detail in the accompanying drawings.

Figure 1:
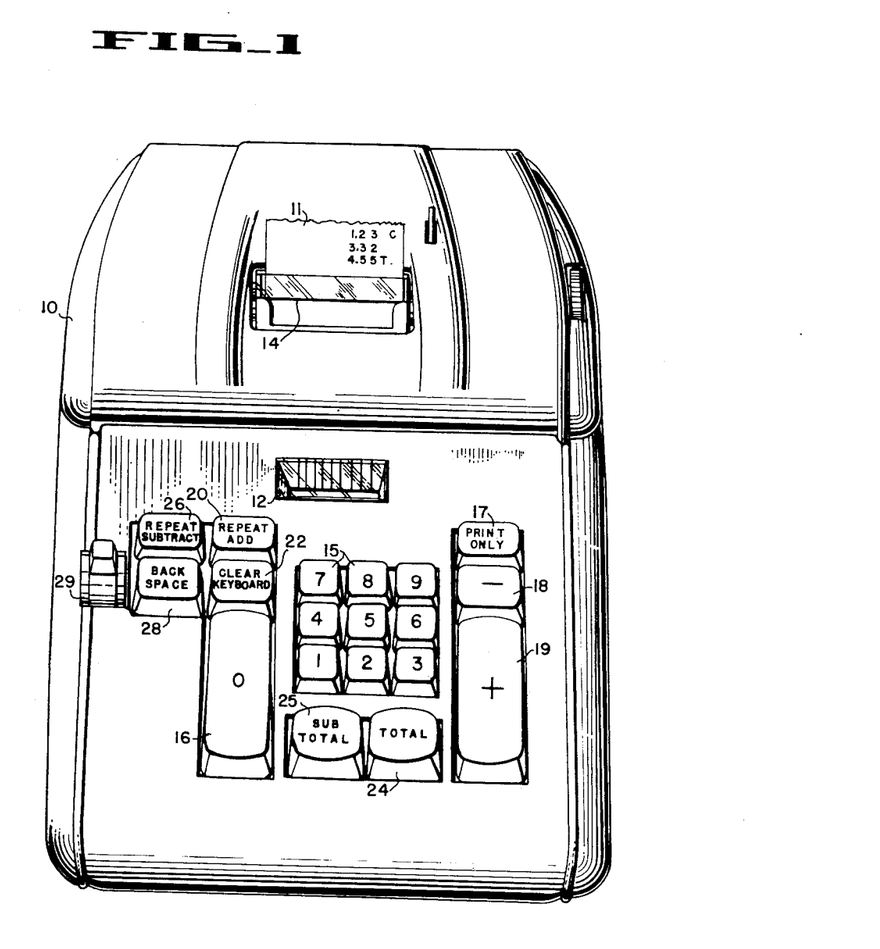
FIG. 1 is a top plan view of an adding machine having a repeat subtraction key and optionally useable automatic multiplying mechanism illustrative of the invention.

With continued reference to the drawings, the machine, as shown in FIG. 1, is a ten-key adding machine having a cover 10 provided with openings through which the paper tape 11 extends and the digit keys and control keys project, and through which the check dials 12 may be read. A paper guide and tear strip assembly 14 is mounted on one side of the opening through which the paper strip extends, and a transparent pane covers the openings through which the check dials are read. There are nine digit keys 15 arranged in a 3 x 3 square pattern near the center of the forward portion of the machine and consecutively numbered from "1" to "9," inclusive. An elongated "0" key 16 is disposed at the left-hand side of the square of digit keys, where it may be conveniently operated by the thumb of the right hand of the operator, who normally uses the fingers of the same hand to operate the digit keys 15.

The control keys include a print only key 17, a subtract key 18 and an addition key 19 arranged in a row at the right-hand side of the square of digit keys 15. A repeat addition key 20 and a keyboard clear key 22 are disposed at the left-hand side of the square of digit keys and rearwardly of the rearward end of the "0" key 16. A total key 24 and a subtotal key 25 are disposed forwardly of the square of digit keys 15 and between the addition key 19 and the "0" key 16. A repeat subtract key 26 is disposed to the left of the repeat addition key 20, and a back-space key 28 is disposed to the left of the keyboard clear key 22.

The machine is provided with a multiply arm which acts on the escapement mechanism of the pin carriage of the ten-key machine to cause the pin carriage to escape one step to the left, without the necessity of entering a "0" into the mechanism of the machine, each time the repeat addition or the repeat subtraction key is sequentially depressed and released. A manually operated lever 29 is disposed on the left-hand side of the repeat subtract and back-space keys 26 and 28 to optionally render this multiply arm effective or ineffective to cause escapement of the pin carriage.

Figure 8:
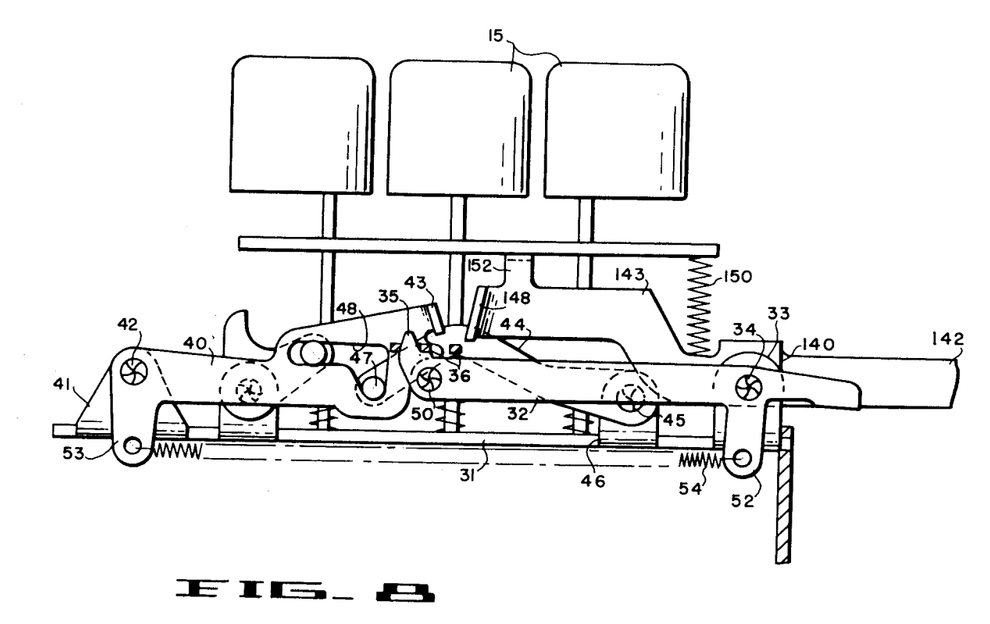
FIG. 8 is a fragmentary cross-sectional rear view of the selection escapement mechanism.
Figure 9:
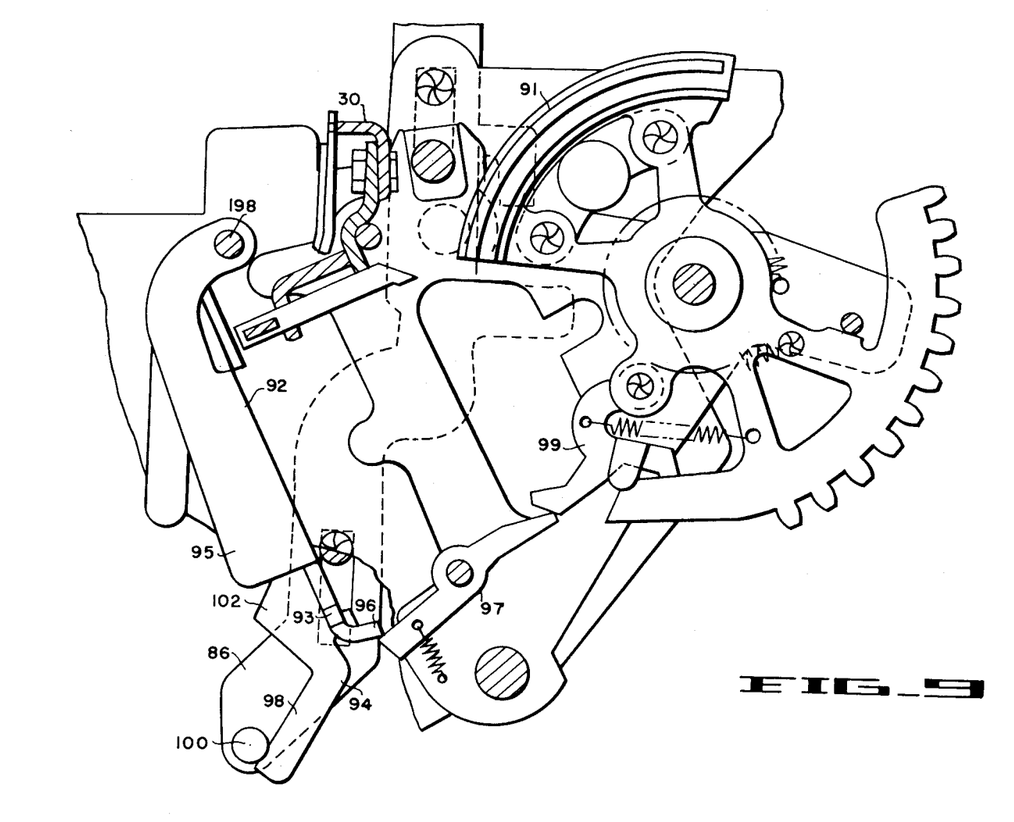
FIG. 9 is a fragmentary cross-sectional right side view of the settable sector portion of the selection mechanism, and is taken substantially on the plane, or on a plane parallel to, the plane indicated by the line 9—9 on FIG. 2.

The shiftable portion of the selection mechanism includes a carriage, a plurality of the selection sector assemblies shown in FIG. 9, and a pin box carrying the settable stop pins for the selection racks or sectors. The carriage is provided with an escapement rack, or comb, 30 which moves transversely of an escapement mechanism mounted at the rearward end of the keyboard 31 of the machine and operated by the digit keys 15 and "0" key 16, as shown in FIG. 8.

Referring particularly to FIG. 8, the escapement mechanism includes a lever 32 pivoted near one end on an ear 33 upstanding from the left rear corner of the bottom plate of the keyboard 31 by a pivot pin 34, and extending from this pivot pin to the right (to the left in FIG. 8) and somewhat beyond the transverse center of the keyboard. At its right-hand end, this lever 32 is provided with an upstanding detent formation 35 which engages between two adjacent teeth 36 of the escapement rack 30, FIG. 2, when this end of the lever is in its raised position, as shown in FIG. 8. A second lever 40 is pivoted at one end on an upstanding ear 41 at the right rear corner of the lower plate of the keyboard 31, by a pivot pin 42. This lever 40 extends to the left from the pivot pin 42 into overlapping relationship with the distal end of the lever 32. The lever 40 carries at its distal end an offset ear, or abutment, 43, which is disposed above the escapement rack 30 when the lever 40 is in its raised position, as illustrated in FIG. 8, but which moves downwardly between adjacent teeth 36 of the escapement rack when the distal end of the lever 40 is depressed.

A pair of parallel arms, one of which is shown in FIG. 8 and indicated at 44, are mounted at their proximal ends on a common shaft 45 extending longitudinally of the keyboard near the left-hand edge of the lower plate of the keyboard frame. The shaft 45 is supported by ears, as indicated at 46, upstanding from the lower plate of the keyboard frame. A shaft, or rod, 47 extends through the arms 44, near the distal ends of these arms, and is disposed in spaced and parallel relationship to the shaft 45. The shaft 47 has a rearward extension which projects through an opening 48 in the lever 40 and is engaged by the key stems of all of the digit keys 15 and the stem of the "0" key 16 of the machine so that, when any one of these keys is depressed, the rod 47 is forced downwardly and forces the distal end of the lever 40 downwardly. A pin 50 is mounted on the lever 32 near the distal end of this lever, and extends under a shoulder provided at the distal end of the lever 40, so that the distal ends of both of the levers 32 and 40 are forced downwardly whenever a digit key or the "0" key is depressed. This moves the detent formation 35 of the lever 32 downwardly, out of the interdental space in which it is engaged with the escapement rack 30, and forces the abutment formation 43 on arm 40 into the adjacent interdental space of the rack. This permits the rack to move one-half of a step toward the left (to the right in FIG. 8) and, when the key is released and the distal ends of the levers 32 and 40 rise, the abutment formation 43 is moved out of the interdental space in which it is engaged and the detent formation 35 engages in the adjacent interdental space to the right, thereby completing a full step of the escapement rack 30 and the pin carriage and selection sector assembly of the machine to the left.

An arm 52 of the lever 32 extends downwardly from the pivot pin 34, and a corresponding arm 53 of the lever 40 extends downwardly from the pivot pin 42. The lower ends of these arms 52 and 53 are connected by a tension spring 54, which acts to resiliently urge the distal ends of the levers 40 and 32 upwardly, to the position shown in FIG. 8.

Figure 2:
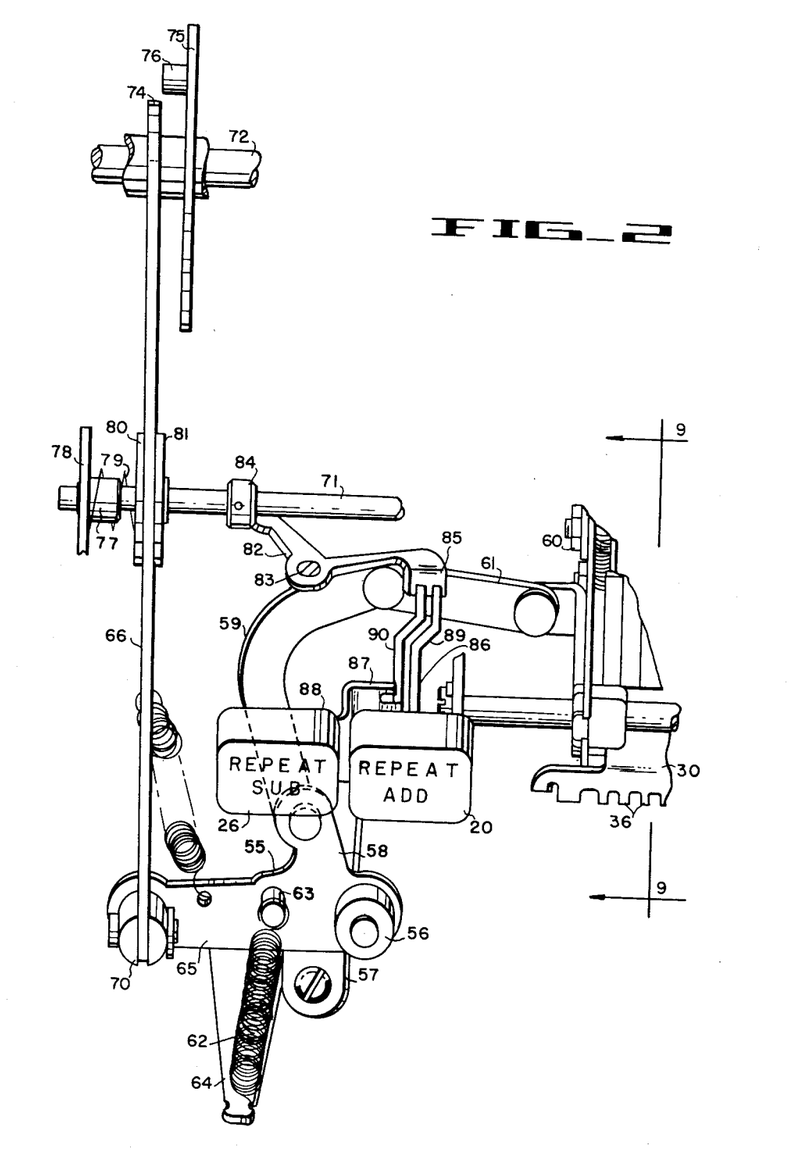
FIG. 2 is a top plan view of a fragmentary portion of the mechanism showing the repeat addition and repeat subtraction keys and a portion of the mechanism operated by these keys.
Figure 3:
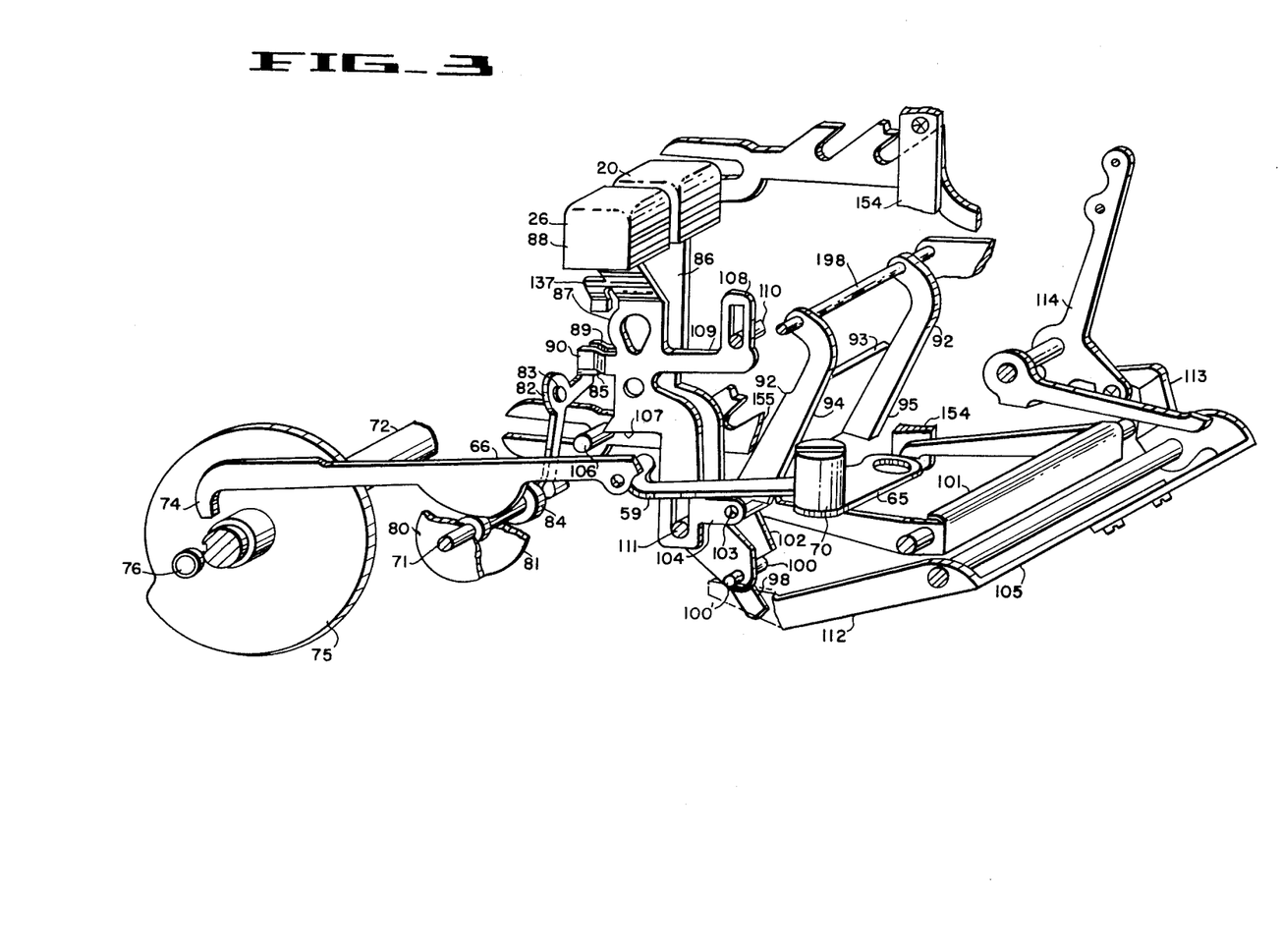
FIG. 3 is a perspective view of the mechanism shown in FIG. 2.

FIGS. 2 and 3 illustrate the mechanism for resiliently urging the selection carriage of the machine in a leftward direction under the control of the above-described escapement mechanism, and for restoring the carriage to its full-cycle, right-hand, or home, position at the termination of a machine operation.

A two-part bellcrank lever 55 is pivotally mounted at its angle on a pivotal mounting 56, which is, in turn, mounted on a bracket 57 secured to the base of the machine below the keyboard 31. One arm of the lever 55 is provided in two parts 58 and 59 disposed substantially in end-to-end relationship and adjustably secured together. This two-part arm extends rearwardly from the pivotal connection, and is connected at its rear end to the carriage 60 of the machine by a link 61, which is pivotally connected, at one end, to the rear end of the lever arm 59, and pivotally connected at its other end, to an ear extending to the left from the left-hand side of the carriage 60. A tension spring 62, connected between a stud 63 on the lever 55 and the forward end of a forwardly projecting extension 64 of the bracket 57, resiliently urges the lever 55 to turn about the pivotal mounting 56 in a direction to shift the carriage 60 from right to left. The lever 55 has a second arm 65 extending to the left from the pivotal mounting 56. An elongated link 66 is connected at its forward end to the left-hand end of the arm 65 by a universal joint connection 70. The link 66 extends rearwardly from the connection 70 over a shaft 71, mounted in the machine frame for longitudinal sliding movements, and over the rotatable main power shaft 72 of the machine. At its rearward end, the link 66 is provided with a downwardly extending hook formation 74. A plate, or disk, 75 is mounted on the main power shaft 72 beside the rearward end portion of the link 66, and carries a stud 76 radially spaced from the shaft 72 and engageable with the hook formation 74 to pull the link 66 rearwardly near the end of an operating cycle of the machine, this stud being moved out of engagement with the hook formation 74 before the cycle terminates. The link is biased by a spring, not identified, to lie adjacent disk 75, so that the hook 74 will be engaged by stud 76, but can be shifted to the left, as it is in repeat operation, described hereafter, to the position shown in FIG. 2. In this inoperative position of link 66, the hook 74 lies to the left of the path of travel of stud 76, so link 66 cannot be operated to restore selection carriage 60.

With the above-described arrangement, as the value keys of the machine are successively depressed, the pin carriage is stepped from its original right-hand, or home, position to the left by the escapement mechanism, illustrated in FIG. 8 and described above, under the urgency of the spring 62. When the machine is cycled, in non-repetitive operation, the link 66 turns the lever 55 and forces the carriage 60 back to its original right-hand position against the force of spring 62 and the escapement mechanism then latches the pin carriage in the right-hand position. During the cycling of the machine, the selection mechanism is also restored to its "0" condition and any pins of the pin carriage which have been set during selection are returned to their retracted, or inoperative, position.

When it is desired to repeatedly add or subtract the same value, it is necessary that the operation of the selection mechanism be modified so that the pin carriage and selection sector assembly is not restored to its right-hand position at the end of any addition or subtraction cycle, and so that the selection mechanism is not restored to its "0" condition at the end of any such cycle. When either the repeat addition key 20 or the repeat subtraction key 26 is depressed, the restoration of the pin carriage and selection register of the machine to its right-hand position is blocked by the following mechanism.

A pair of disks, or annular flanges, 80 and 81 are mounted on the shaft 71 and disposed one at each side of the intermediate portion of the restore link 66. The left-hand end of the shaft 71 extends slidably through a bearing 77 mounted on the left-hand side frame member 78 of the machine. A compression spring 79, surrounding the shaft between the frame member 78 and the left-hand disk 80, resiliently urges the link 66 to the right and to a position such that the stud 76 on the disk 75 will engage the hook formation 74 on the rearward end of the link 66 and pull the link 66 rearwardly to restore the selection mechanism near the end of an operating cycle of the machine. A bellcrank lever 82 is disposed adjacent the shaft 71, being pivotally mounted at its angle on a fixed pivot 83. One arm of this bellcrank extends downwardly and bears, at its distal end, against the right-hand end of a collar 84 secured on the shaft 71. The other arm of the bellcrank lever 82 extends to the right from the pivot pin 83, and is provided at its distal end with an angularly offset and forwardly extending lip formation 85.

The repeat add key has an elongated stem 86 mounted on the machine frame for a limited freedom of vertical movement. The repeat subtract key has a similar stem 87 similarly mounted on the machine frame and provided at its upper end with a leftwardly directed offset portion which carries the repeat subtract key top 88. The key stem 86 of the repeat add key has, near its upper end, a rearwardly directed arm 89, which bears on the lip formation 85 of the bellcrank lever 82. The stem 87 of the repeat subtract key has a similar, rearwardly directed arm 90, which also bears, at its rearward end, on the lip formation 85.

With this arrangement, whenever the repeat add or the repeat subtract key is depressed, the bellcrank 82 is rocked about the pivotal mounting 83 in a direction to shift the shaft 71 to the left against the force of spring 79. This moves the hook formation 74 on the rearward end of the link 66 out of the path of the stud 76 and the link will not be pulled rearwardly at the end of a machine cycle to restore the selection mechanism to its right-hand, or full-cycle, position.

Figure 4:
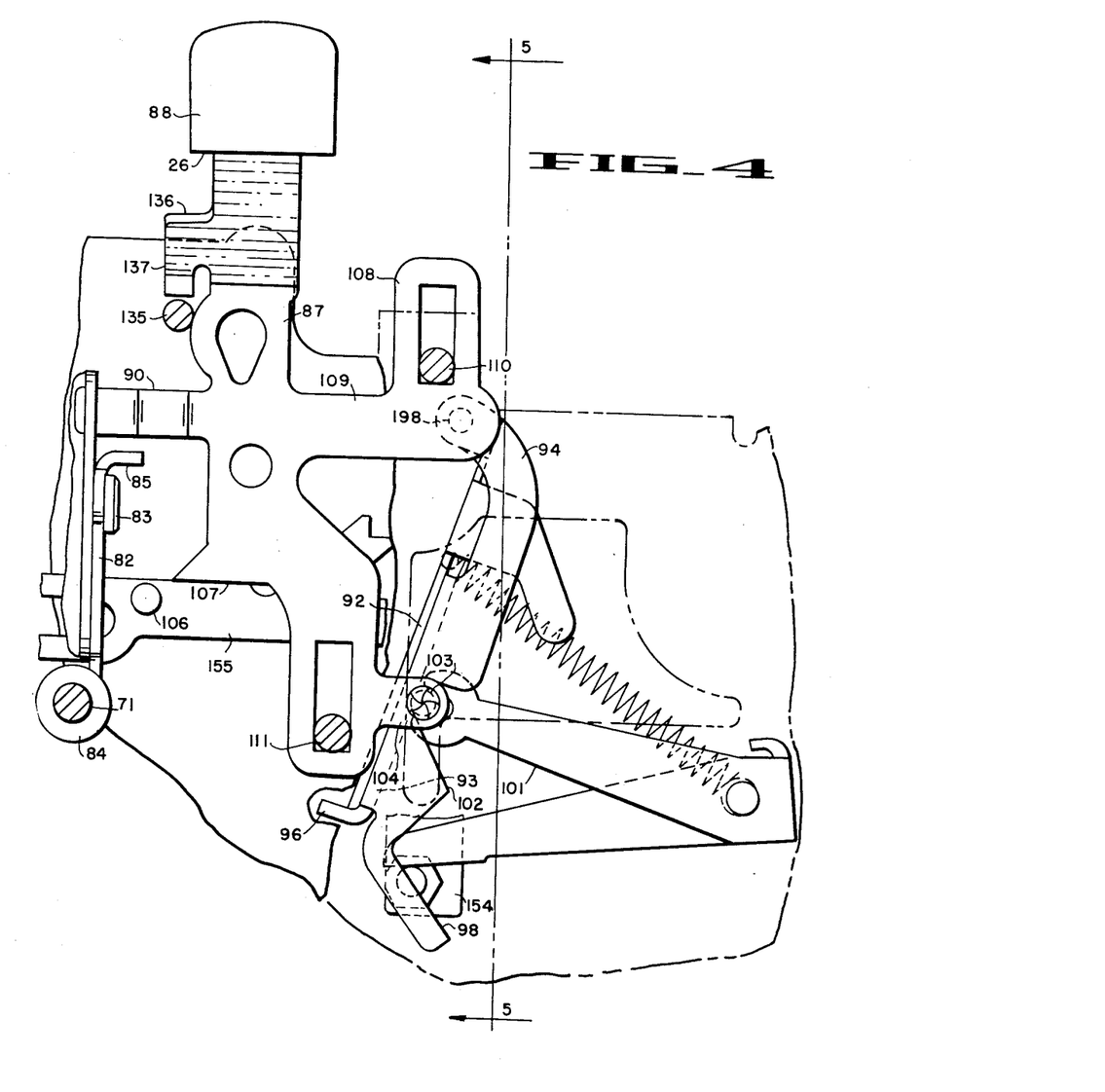
FIG. 4 is a side elevational view of the repeat subtract key and the mechanism immediately associated with this key.

In order to block restoration of the selection racks, or sectors, 91 to "0" condition, a blocking bail 92, FIGS. 4 and 9, is provided at the forward side of the selection carriage. The blocking bail comprises a flat intermediate portion 93, flange portions 94 and 95, forwardly directed, one from each end of the intermediate portion 93, and disposed in parallel relationship to each other, and a rearwardly directed transverse flange 96 at the bottom edge of the intermediate portion 93. At their upper ends, the flange portions 94 and 95 are pivotally mounted on a shaft 198, which extends transversely of the machine forwardly of the selection sectors, and is supported, at its ends, by the keyboard frame so that the lower end of the bail can swing forwardly and rearwardly to a limited extent. When the lower end of the bail 92 is in its forward position, the zero latch dogs 97 of the selection mechanism are left free to latch the selection sectors 91 in their "0" position by engaging the live points 99 on the ends of the rack portions of the selection sectors. When the bail is rocked so that its lower end is positioned in a rearward position, as shown in FIG. 9, the flange 96 engages the zero latch dogs 97 and holds these dogs in a position such that the live points 99 ride up on the rearward ends of the latch dogs when the sectors are returned to "0" position and the latch dogs cannot latch the selection sectors in "0" position. The sectors to the left of the selection position will immediately return to the positions determined by the set stop pins of the corresponding orders of the register at the end of the operating cycle, all of which has been fully described in the Patent No. 2,832,530, referred to above.

At its lower end, the left-hand bail 94 is provided with a downwardly and forwardly inclined cam edge 98. A pin 100 extends through the lower end portion of the repeat addition key stem 86 and engages the cam edge 98 to rock the lower end of the blocking bail 92 rearwardly when the repeat addition key is depressed. Above the cam edge 98, the bail 94 is provided with a second downwardly and forwardly inclined cam edge 102. A pin 103 extends through a forward extension 104 of the repeat subtract key stem 87 and rocks the bail 92 rearwardly when the repeat subtract key is depressed. Thus, depression of either the repeat addition key 20 or the repeat subtraction key 26 will block the restoration of the selection sectors 91 to their zero condition.

In addition to blocking the return of the shiftable selection mechanism to its right-hand position and blocking the restoration of selection sectors to their "0" position, the repeat addition key acts, through bail 105 (FIG. 3) on the addition mechanism of the machine, to provide otherwise normal addition cycles. Bail 105 extends across the front end of the machine and has a left-hand arm 112 engaged by a pin 100′ on the lower end of the repeat addition key stem 86 to rock the bail, and a right-hand arm 113 engaging one arm of a bellcrank 114 of the addition mechanism. The repeat subtraction key, in addition to blocking the return and restoration of the selection mechanism, as described above, also operates through bail 101 (FIGS. 3 and 4). The pin 103 is elongated and engages the left-hand arm of the bail 101 to rock the bail. The right-hand arm of bail 101 engages the lower end of the subtraction key stem 154 and moves the stem 154 downwardly to operate the subtraction mechanism when the bail 101 is rocked by depression of the repeat subtraction key.

A left-hand clutch and motor switch-operating slide 155 extends past the inner side of the repeat addition key and has a shoulder which blocks operation of the repeat addition key when any other control key is operated. A pin 106 projects outwardly from the slide 155 and, when any control key other than the repeat subtraction key is depressed, this pin rides under a transverse shoulder 107 on the repeat subtraction key stem 87 and blocks operation of the repeat subtraction key. When the repeat subtraction key is depressed first, the shoulder 107 will pass by the pin 106, as shown in FIG. 4.

The arrangement is such that either the repeat addition or the repeat subtraction key will cause the machine to cycle continuously as long as the repeat key is held in depressed position.

The upper end of the repeat addition key stem 86 is guided by a pin, not identified, but shown in FIG. 9, mounted on the adjacent side frame member of the machine, which pin projects into a slot formed in the upper portion of this key stem. The upper portion of the repeat subtraction key is guided by a rectangular loop 108 extending upwardly from a forward extension 109 of this key stem, and receiving an extension of a pin 110 which guides the upper end of the keyboard clear key 22. The lower ends of both the repeat addition and repeat subtraction key stems are guided by a common, elongated pin 111 received in elongated slots in the lower ends of the key stems.

Figure 5:
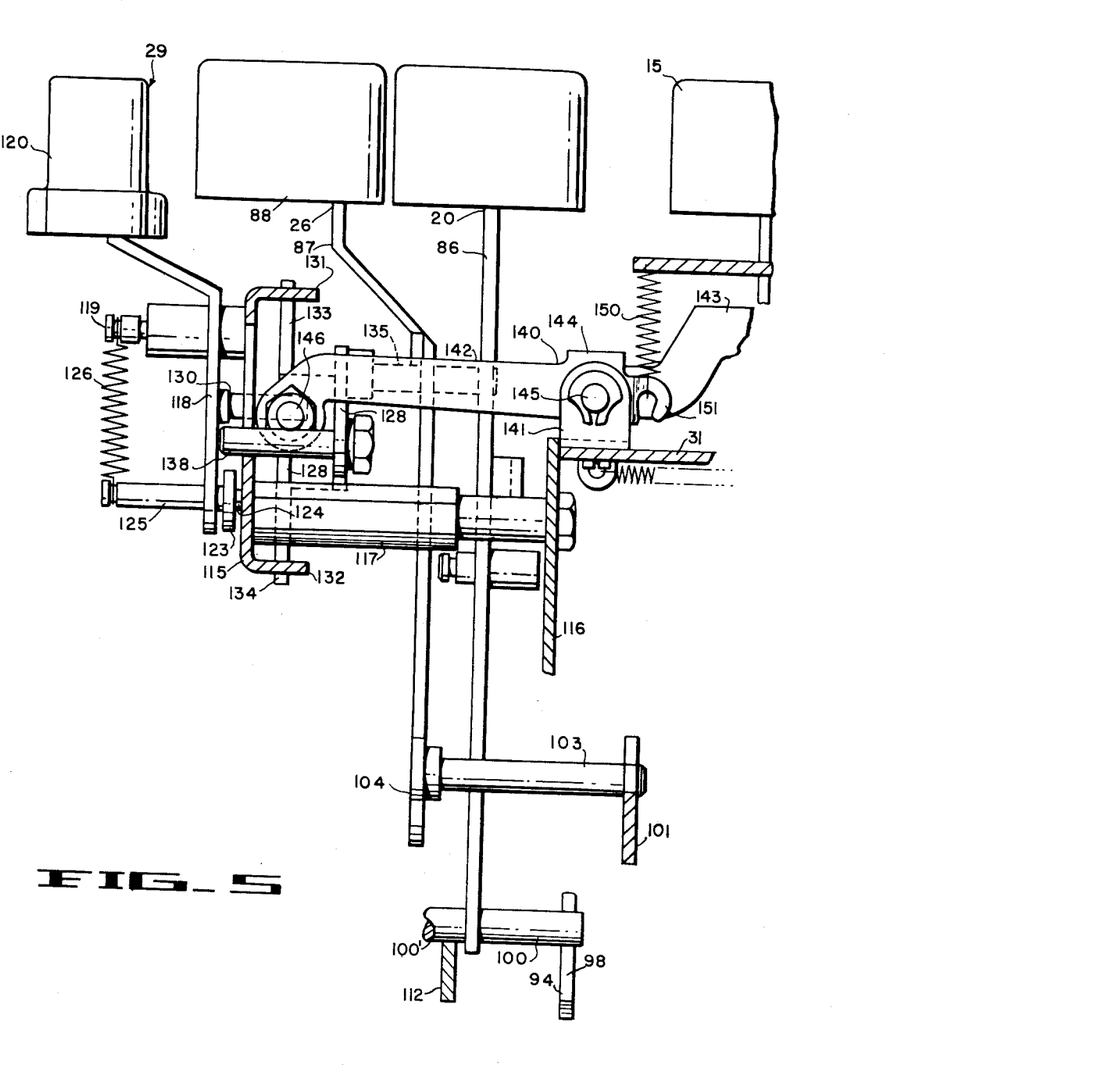
FIG. 5 is a cross-sectional view on the plane indicated by the line 5—5 of FIG. 4, with a portion of the mechanism shown in FIG. 4 omitted.
Figure 6:
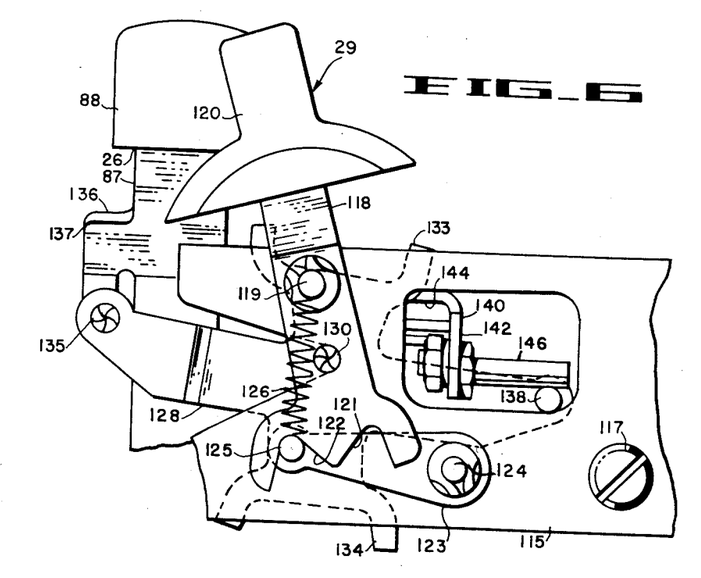
FIG. 6 is a fragmentary left side elevational view showing a setting lever for an optionally useable multiplier arm and is taken to the left of the elevation shown in FIG. 4.
Figure 7:
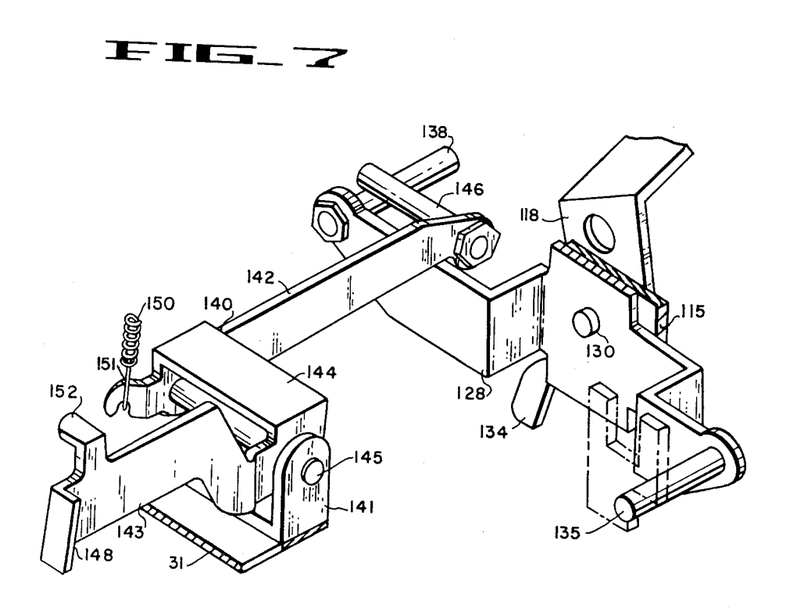
FIG. 7 is a fragmentary perspective view of the mechanism shown in FIG. 6.

In order to use the repeat addition or the repeat subtraction key for multiplication, the multiplicand is entered into the shiftable portion of the selection mechanism through the keyboard. The multiplier is then entered through the selected repeat key by holding the repeat key depressed for a number of machine cycles corresponding to the lowest digit of the multiplier, releasing the key and shifting the shiftable portion of the selection mechanism one step to the left and then holding the repeat key depressed for a number of machine cycles corresponding to the second digit of the multiplier, and continuing this process until all of the digits of the multiplier have been entered. While the shiftable carriage can be shifted a step to the left after the entry of each digit of the multiplier by depressing the "0" key of the machine, this requires an additional action of the machine operator. It has been found that multiplication on the ten-key adding machine can be greatly facilitated by providing means for automatically shifting the selection carriage one step to the left each time a repeat key is depressed and subsequently released. Since it is, at times, desired to use the repeat keys for purposes other than multiplication, it has also been found desirable to render the automatic escapement of the selection mechanism carriage to the left optional, so that this action may be caused to take place, or may be blocked, at the will of the operator. Suitable mechanism for accomplishing these functions is illustrated in FIGS. 5, 6 and 7.

A mounting plate 115 is rigidly mounted on an intermediate, vertical frame plate 116 of the machine by suitable means, such as the spacer bolt 117. An optional control lever 118 is rockably mounted on this mounting plate by a pivot pin 119 which projects to the left from the mounting plate the hub of the lever 118 being located at a point intermediate the length of the lever. A knob, or top, 120 is mounted on the upper end of lever 118 for rocking the lever, and the lower end of the lever is provided with a pair of spaced-apart notches 121 and 122. A detent lever 123 is pivotally mounted at its proximal end on a pivot pin 124 carried by the mounting plate 115. This lever carries, at its distal end, a stud 125 which sets in one or the other of the notches 121 and 122 to releasably hold the lever 118 in position to render the automatic escapement mechanism operative, or in position to render this mechanism inoperative. A spring 126, connected between the stud 125 and the pivot pin 119, resiliently urges the stud 125 into the notches 121 and 122. A rocking lever 128 is disposed at the inner side of the mounting plate 115, or at the right-hand side of this plate, and is pivotally mounted intermediate its length on the lever 118 below the pivot pin 119 by a pivot stud 130. The mounting plate 115 has upper and lower slotted flanges 131 and 132, and the rocking lever 128 has upwardly and downwardly extending guide lugs 133 and 134, which extend through these slots in the corresponding flanges 131 and 132 to guide the lever 118 in its rocking and shifting movements.

An elongated stud 135 extends perpendicularly to the right from the rearward end of the lever 128, and underlies rearward extensions 136 and 137 of the repeat add and repeat substract key stems 86 and 87 so that, when the lever 128 is rocked to its forward position by the manual control lever 118, the extension 136 or 137 will engage the stud 135 and rock the lever 128 in a direction to raise the forward end of this lever whenever the repeat addition or the repeat subtraction key is depressed. However, if the lever 128 is rocked to its rearward position by the manual control lever 118, the stud 135 will be disposed rearwardly of the rearward ends of the extensions 136 and 137, and the lever 128 will not be rocked when the repeat addition or the repeat subtraction key is depressed, and the automatic escapement mechanism is thus rendered inoperative.

An elongated stud 138 projects perpendicularly to the left from the forward end of the rocking lever 128. An automatic escapement lever 140 is pivotally mounted intermediate its length on a U-shaped bracket 141 mounted on the left-hand portion of the bottom plate of the frame of the keyboard 31. The lever 140 has arms 142 and 143 laterally offset longitudinally of the machine and relative to each other, and interconnected at their adjacent ends by a bail portion 144. A pivot pin 145, on which this lever is rockably mounted, extends through the bail portion 144 and through the legs of the bracket 141. The lever arm 142 extends from the pivot pin 145 to the left over the forward portion of the lever 128. This lever arm carries at its left-hand end an elongated stud 146, which extends perpendicularly forwardly from the arm 142 over the stud 138 carried by the lever 128 so that, when the forward end of the lever 128 is rocked upwardly by depression of a repeat key with the lever 128 in its forward, operative position, the left-hand end of the lever arm 142 is rocked upwardly and the right-hand end of the lever arm 143 is rocked downwardly. The lever arm 143 extends along the escapement lever 32 (FIG. 8) to a location near the detent formation 35 on the right-hand end of lever 32. The lever arm 143 carries, at its right-hand end, a rearwardly projecting abutment formation, or ear, 148, which is normally disposed above the teeth 36 of the escapement rack 30.

A tension spring 150, connected between a spring hook 151 formed on the bail portion 144 of the lever 140 and the top plate of the keyboard frame 31, resiliently urges lever 140 to rock in a direction to raise its right-hand end (left-hand end, as viewed in FIG. 8) and lower its left-hand end. A stop lug 152 extends upwardly from the lever arm 143, near the right-hand end of this arm, and engages the under surface of the top plate of the keyboard frame to limit the upward movement of this end of the lever 140 induced by the spring 150.

When the right-hand end of the lever arm 143 is rocked downwardly, as described above, the bottom edge of the abutment formation 148 on the right-hand end of this lever arm engages the top edge of the escapement lever 32 and forces the right-hand end of the escapement lever down to move the detent formation 35 on the right-hand end of this lever from the interdental space of the escapement rack 30 in which this detent formation is engaged. As the detent formation 35 of the escapement lever 32 is forced downwardly out of the interdental space in which it is engaged, the lower portion of the abutment formation 148 on the lever arm 143 enters the interdental space immediately below this abutment formation. The abutment formation is so formed and located that when the escapement rack 30 is released from the detent formation 35, it moves approximately one-half of a step to the left before being stopped by the abutment formation 148. When the end of the lever 143 carrying the abutment formation 148 is subsequently rocked upwardly, the detent formation 35 of the escapement lever 32 moves upwardly until the upper end of this detent formation engages the under side of the adjacent tooth 36 of the escapement rack, but cannot enter an interdental space with the rack in the half-step position. With continued upward movement of the right-hand end of the lever arm 143, the abutment formation 148 is completely withdrawn from the interdental space in which it is engaged and the rack then completes the remaining half of a full step, and the detent formation 35 enters the interdental space next to the right from that in which it was previously engaged and the shiftable portion of the selection mechanism has then completed a full step to the left. Since the abutment formation 148 is lowered when a repeat key is depressed, and is raised by the spring 150 when the repeat key is released, the selection mechanism carriage will be stepped one space to the left each time a repeat key is sequentially depressed and released, providing that the manual control lever 118 has its knob 120 in rearward position corresponding to the position of this lever to render the automatic escapement mechanism operative. If the knob 120 is in its forward position, the stud 135 will be clear of the extensions 136 and 137 on the repeat key stems and no automatic escapement will take place when the repeat keys are depressed and released.

The adding machine with the equipment herein above-described is thus rendered capable of repeat subtraction and of semiautomatic positive and negative multiplication.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, all changes which come within the meaning and range of equivalency of the claims are, therefore, intended to be embraced therein.

What is claimed is:

1. In a calculating machine having a ten-key keyboard, a shiftable selection mechanism spring-urged to the left from its full-cycle position, key actuated escapement mechanism controlling the leftward shifting of said shiftable selection mechanism, and power operated means effective to restore said shiftable selection mechanism to its full-cycle position at the end of an operating cycle of the machine, a repeat addition key effective to disable said power operated restoring means and establish successive addition cycles of said machine, a repeat subtraction key effective to disable said power operated restore means and establish successive subtraction operations of said machine, escapement operating mechanism actuatable by either said repeat addition or said repeat subtraction key to operate said escapement mechanism and step said shiftable selection mechanism one step to the left upon sequential depression and release of said repeat addition or said repeat subtraction key, and manually positionable means effective to render said escapement operating mechanism operative or inoperative.

2. In a calculating machine having a ten-key keyboard, a shiftable selection mechanism spring-urged to the left from its full-cycle position, key actuated escapement mechanism controlling the leftward shifting of said shiftable selection mechanism, and power operated means effective to restore said shiftable selection mechanism to its full-cycle position at the end of an operating cycle of the machine, a repeat addition key effective to disable said power operated restoring means and establish successive addition cycles of said machine, a repeat subtraction key effective to disable said power operated restore means and establish successive subtraction operations of said machine, and escapement operating mechanism actuatable by either said repeat addition or said repeat subtraction key to operate said escapement mechanism and step said shiftable selection mechanism one step to the left upon sequential depression and release of said repeat addition or said repeat subtraction key.

3. In a calculating machine having a ten-key keyboard, a shiftable selection mechanism spring-urged to the left from its full-cycle position, key actuated escapement mechanism controlling the leftward shifting of said shiftable selection mechanism, and power operated means effective to restore said shiftable selection mechanism to its full-cycle position at the end of an operating cycle of the machine, a repeat key effective to disable said power operated restoring means and establish successive operating cycles of said machine, escapement operating means actuatable by said repeat key to operate said escapement mechanism and step said shiftable selection mechanism one step to the left upon sequential depression and release of said repeat key, and manually positionable means effective to render said escapement operating means operative or inoperative.

4. In a calculating machine including a shiftable selection mechanism having a right-hand home position and spring-urged to the left from said home position, selection keys, escapement means actuated by said selection keys to effect a step-by-step leftward movement of said shiftable selection mechanism, control keys effective to establish operating cycles of the machine and including a repeat key, and power operated restore means effective to return said shiftable selection mechanism to said home position near the end of a machine operating cycle, means actuated by said repeat key to disable said restore means to return said shiftable selection mechanism to its home position, escapement operating mechanism actuatable by said repeat key to step said shiftable selection mechanism one step to the left each time said repeat key is sequentially depressed and released, and manually positionable means effective to render said escapement operating mechanism operable or inoperable.

5. In a calculating machine including a shiftable selection mechanism having a right-hand home position and spring-urged to the left from said home position, selection keys, escapement means actuated by said selection keys to effect a step-by-step leftward movement of said shiftable selection mechanism, control keys effective to establish operating cycles of the machine and including a repeat key, and power operated restore means effective to return said shiftable selection mechanism to said home position near the end of a machine operating cycle, means actuated by said repeat key to disable said restore means to return said shiftable selection mechanism to its home position, mechanism actuatable by said repeat key to operate said escapement means and step said shiftable selection mechanism one step to the left each time said repeat key is sequentially depressed and released, and manually positionable means connected to said mechanism operating said escapement means and effective to render said mechanism operative or inoperative to operate said escapement means when said repeat key is sequentially depressed and released, said mechanism operating said escapement means comprising a first lever rockably mounted intermediate its length on the machine and having one end engageable with said escapement means, a manually positionable lever pivotally mounted on the machine adjacent the other end of said first rockably mounted lever, a second lever rockably mounted intermediate its length on said manually positionable lever and having one end engageable with said other end of said first rockably mounted lever and its other end engageable by the stem of said repeat key, said manually positionable lever being effective to move said second rockably mounted lever into and out of position for engagement of said other end of said second rockably mounted lever by said repeat key stem.

6. In a calculating machine including a shiftable selection mechanism having a rigth-hand home position and spring-urged to the left from said home position, selection keys, escapement means actuated by said selection keys to effect a step-by-step leftward movement of said shiftable selection mechanism, control keys effective to establish operating cycles of the machine and including a repeat key, and power operated restore means effective to return said shiftable selection mechanism to said home position near the end of a machine operating cycle, means actuated by said repeat key to disable said restore means to return said shiftable selection mechanism to its home position, escapement operating mechanism actuatable by said repeat key to operate said escapement means and step said shiftable selection mechanism one step to the left each time said repeat key is sequentially depressed and released, and manually positionable means connected to said mechanism operating said escapement means and effective to render sid mechanism operative or inoperative to operate said escapement means when said repeat key is sequentially depressed and released, said mechanism operating said escapement means comprising a lever rockably mounted intermediate its length on the machine and having one end engageable with said escapement means, and a manually positionable lever pivotally mounted on the machine adjacent said rockably mounted lever and effective to render said rockably mounted lever effective or ineffective to operate said escapement means.

7. In a calculating machine including a shiftable selection mechanism having a right-hand, home position and spring-urged to the left, selection keys, escapement mechanism operated by said selection keys to effect a step-by-step movement of said shiftable selection mechanism to the left, power operated restore means effective to return said shiftable selection mechanism to said home position near the end of each operating cycle of the machine, control keys including an addition key, a subtraction key, a repeat addition key and a repeat subtraction key, mechanism operated alternatively by said addition key and said repeat addition key to establish addition cycles of the machine, mechanism operated alternatively by said subtraction key and said repeat subtraction key to establish subtraction cycles of the machine, mechanism operated alternatively by said repeat addition key and said repeat subtraction key to disable said restore means to return said shiftable selection mechanism to said home position when said repeat addition key or said repeat subtraction key is depressed, means in addition to said selection keys operating said escapement mechanism to step said shiftable selection mechanism one step to the left wherever said repeat addition key or said repeat subtraction key is sequentially depressed and released, and a manually movable element effective to enable and disable the last mentioned means.

References Cited in the file of this patent

UNITED STATES PATENTS

| | | |
|---|---|---|
| 2,237,881 | Landsiedel | Apr. 8, 1941 |
| 2,682,371 | Benninger | June 29, 1954 |
| 2,695,134 | Sundstrand | Nov. 23, 1954 |
| 2,821,341 | Barnhardt | Jan. 28, 1958 |
| 2,838,235 | Snyder | June 10, 1958 |
| 2,868,445 | Chall et al. | Jan. 13, 1959 |